United States Patent
Kupsch et al.

(10) Patent No.: US 10,471,688 B2
(45) Date of Patent: Nov. 12, 2019

(54) FILMS CONTAINING FUNCTIONAL ETHYLENE-BASED POLYMER COMPOSITIONS

(71) Applicants: Dow Brasil Indústria e Comércio de Produtos Químicos Ltda., São Paulo-SP (BR); Dow Global Technologies LLC, Midland, MI (US)

(72) Inventors: Eva-Maria Kupsch, Waedenswil (CH); Didem Oner-Deliormanli, Bellaire, TX (US); Marlos Giuntini De Oliveira, Sao Paulo (BR); Ashish Batra, Zionsville, IN (US)

(73) Assignees: Dow Global Technologies LLC, Midland, MI (US); Dow Brasil Indústria e Comércio de Produtos Químicios Ltda. (BR)

( * ) Notice: Subject to any disclaimer, the term of this patent is extended or adjusted under 35 U.S.C. 154(b) by 302 days.

(21) Appl. No.: 14/424,744

(22) PCT Filed: Mar. 15, 2013

(86) PCT No.: PCT/US2013/032493
§ 371 (c)(1),
(2) Date: Feb. 27, 2015

(87) PCT Pub. No.: WO2014/035483
PCT Pub. Date: Mar. 6, 2014

(65) Prior Publication Data
US 2015/0217543 A1   Aug. 6, 2015

Related U.S. Application Data

(60) Provisional application No. 61/693,798, filed on Aug. 28, 2012.

(51) Int. Cl.
*B32B 27/08* (2006.01)
*B32B 7/12* (2006.01)
(Continued)

(52) U.S. Cl.
CPC ............. *B32B 27/08* (2013.01); *B32B 7/12* (2013.01); *B32B 27/308* (2013.01); *B32B 27/32* (2013.01);
(Continued)

(58) Field of Classification Search
None
See application file for complete search history.

(56) References Cited

U.S. PATENT DOCUMENTS 3,432,591 A * 3/1969 Heffelfinger ............ B29C 55/00
264/290.2
3,875,119 A * 4/1975 Aoki ....................... B29C 55/12
264/235

(Continued)

FOREIGN PATENT DOCUMENTS

EP        1049751        11/2000
JP     H03227236 A       10/1991
(Continued)

OTHER PUBLICATIONS

De Gooijer, J.M., et al., Polymer Engineering & Science, 2001, pp. 86-94, vol. 41. (Abstract).

(Continued)

*Primary Examiner* — Vivian Chen
(74) *Attorney, Agent, or Firm* — Dinsmore & Shohl LLP

(57) ABSTRACT

The invention provides a film comprising at least two layers, a first layer and a second layer; and wherein the first layer is formed from a first composition comprising a polyester and/or a polylactic acid; and wherein the second layer is formed from a second composition comprising at least the (Continued)

Sealed Film following: A) a functionalized ethylene-based polymer, and B) at least one ethylene/alkylacrylate copolymer.

12 Claims, 2 Drawing Sheets

(51) Int. Cl.

| | | |
|---|---|---|
| B32B 27/30 | (2006.01) | |
| B32B 27/32 | (2006.01) | |
| B32B 27/36 | (2006.01) | |
| B32B 7/02 | (2019.01) | |
| C08L 23/06 | (2006.01) | |
| C08L 23/36 | (2006.01) | |
| C08L 33/08 | (2006.01) | |
| C08L 23/20 | (2006.01) | |
| C08L 33/06 | (2006.01) | |
| C08L 33/02 | (2006.01) | |
| C08L 23/08 | (2006.01) | |
| C09J 123/08 | (2006.01) | |
| C09J 133/06 | (2006.01) | |
| C09J 133/08 | (2006.01) | |
| C09J 133/02 | (2006.01) | |
| C09J 7/35 | (2018.01) | |

(52) U.S. Cl.
CPC .............. *B32B 27/36* (2013.01); *B32B 7/02* (2013.01); *B32B 27/30* (2013.01); *B32B 2250/02* (2013.01); *B32B 2250/24* (2013.01); *B32B 2307/30* (2013.01); *B32B 2307/31* (2013.01); *B32B 2307/70* (2013.01); *B32B 2307/72* (2013.01); *B32B 2323/046* (2013.01); *B32B 2333/08* (2013.01); *B32B 2367/00* (2013.01); *B32B 2439/00* (2013.01); *B32B 2439/70* (2013.01); *B32B 2439/80* (2013.01); *C08L 23/06* (2013.01); *C08L 23/08* (2013.01); *C08L 23/0815* (2013.01); *C08L 23/0846* (2013.01); *C08L 23/0869* (2013.01); *C08L 23/20* (2013.01); *C08L 23/36* (2013.01); *C08L 33/02* (2013.01); *C08L 33/06* (2013.01); *C08L 33/08* (2013.01); *C09J 7/35* (2018.01); *C09J 123/08* (2013.01); *C09J 123/0815* (2013.01); *C09J 123/0846* (2013.01); *C09J 123/0869* (2013.01); *C09J 133/02* (2013.01); *C09J 133/06* (2013.01); *C09J 133/08* (2013.01); *Y10T 428/2817* (2015.01); *Y10T 428/2826* (2015.01); *Y10T 428/2878* (2015.01); *Y10T 428/2891* (2015.01); *Y10T 428/31786* (2015.04); *Y10T 428/31797* (2015.04); *Y10T 428/31935* (2015.04); *Y10T 428/31938* (2015.04)

(56) References Cited

U.S. PATENT DOCUMENTS

| | | | | |
|---|---|---|---|---|
| 4,312,918 A * | 1/1982 | Bostwick | ................ | C08L 23/06 428/379 |
| 4,487,885 A * | 12/1984 | Adur | ....................... | B32B 27/04 525/74 |
| 4,537,839 A * | 8/1985 | Cameron | ................ | H01M 8/04 429/420 |
| 4,639,398 A | 1/1987 | Bergstrom | | |
| 4,640,870 A * | 2/1987 | Akazawa | ................. | B32B 27/08 428/349 |
| 4,810,581 A * | 3/1989 | Akazawa | ................... | C09J 4/06 428/353 |
| 4,810,755 A | 3/1989 | Akazawa et al. | | |
| 5,053,457 A * | 10/1991 | Lee | ........................ | C09J 123/08 428/483 |
| 5,139,805 A | 8/1992 | Tada et al. | | |
| 5,272,236 A | 12/1993 | Lai et al. | | |
| 5,532,066 A * | 7/1996 | Latiolais | ................... | C08F 8/44 428/483 |
| 5,543,233 A * | 8/1996 | Latiolais | ................... | C08F 8/44 428/516 |
| 6,682,825 B1 * | 1/2004 | Kennedy | ................. | B32B 27/08 428/213 |
| 6,902,818 B2 * | 6/2005 | Murschall | ............... | B32B 27/18 264/211.12 |
| 7,635,509 B2 | 12/2009 | Chen | | |
| 2003/0068500 A1 | 4/2003 | Murschall et al. | | |
| 2004/0048086 A1 * | 3/2004 | Kennedy | ................. | B32B 27/08 428/517 |
| 2004/0072970 A1 * | 4/2004 | Domine | ................ | C08F 210/02 526/64 |
| 2004/0116569 A1 * | 6/2004 | Ward | ........................ | C08F 8/12 524/366 |
| 2004/0249071 A1 * | 12/2004 | McFaddin | ............. | C08F 255/02 525/70 |
| 2005/0019516 A1 * | 1/2005 | Pradel | ................. | C08L 23/0815 428/35.7 |
| 2005/0159549 A1 * | 7/2005 | Kendig | ................... | B32B 27/08 525/119 |
| 2006/0014900 A1 * | 1/2006 | McFaddin | ............. | C08F 255/02 525/191 |
| 2006/0025527 A1 * | 2/2006 | Chou | ........................ | B32B 7/12 525/191 |
| 2006/0160952 A1 * | 7/2006 | Chou | .................. | C08L 23/0853 525/191 |
| 2006/0199914 A1 | 9/2006 | Harris et al. | | |
| 2007/0155900 A1 * | 7/2007 | Chang | ................. | A61F 13/4902 525/88 |
| 2007/0275219 A1 | 11/2007 | Patel et al. | | |
| 2009/0035594 A1 * | 2/2009 | Lee | ........................ | B32B 7/12 428/476.9 |
| 2009/0242030 A1 | 10/2009 | Kirschner et al. | | |
| 2009/0317614 A1 * | 12/2009 | Nilsen | ..................... | B32B 27/32 428/219 |
| 2012/0064269 A1 * | 3/2012 | Vogt | ........................ | B32B 7/12 428/35.7 |
| 2015/0151517 A1 * | 6/2015 | Oner-Deliormanli | ...................... | B32B 27/06 428/483 |
| 2015/0336365 A1 * | 11/2015 | Kupsch | ................... | B32B 27/32 428/476.9 |

FOREIGN PATENT DOCUMENTS

| | | |
|---|---|---|
| JP | 2006117709 A | 5/2006 |
| JP | 2008062410 A | 3/2008 |
| JP | 2008221813 A | 9/2008 |
| WO | 1993006137 A1 | 4/1993 |
| WO | 2008023721 A1 | 2/2008 |
| WO | 2008080111 A1 | 7/2008 |
| WO | 2008149997 A1 | 12/2008 |
| WO | 2009120824 A1 | 10/2009 |
| WO | 2010/042334 A1 | 4/2010 |
| WO | 2012/037180 A1 | 3/2012 |

OTHER PUBLICATIONS

Becker, et al., Annual Technical Conference-Society of Plastic Engineers, 1991, 49th.
International Search Report and Written Opinion for PCT/US2013/032493, dated Jun. 17, 2013, pp. 1-8.
International Preliminary Report on Patentability for PCT/US2013/032493, dated Mar. 3, 2015, pp. 1-5.
Durgan, H, et al., Journal of Adhesion Science and Technology, 2005, pp. 407-425, vol. 19. (Abstract).

* cited by examiner

Sealed Film

FILMS CONTAINING FUNCTIONAL ETHYLENE-BASED POLYMER COMPOSITIONS

REFERENCE TO RELATED APPLICATIONS

This application claims the benefit of U.S. Provisional Application No. 61/693,798, filed on Aug. 28, 2012.

BACKGROUND OF THE INVENTION

Polyethylene terephthalate (PET) is increasingly used in the outer layer of oriented films, in direct co-extrusion, to give the film the stiffness, heat resistance, and gloss. The PET provides, in combination with a barrier film, like PE-PA-EVOH-PA-PE film, the high stiffness, temperature resistance, puncture resistance, and high barrier properties needed to package food, with the security of a high oxygen barrier and excellent puncture resistance. To produce such films, the PET has to be coextruded, using an extrudable tie layer that can provide the interlayer adhesion between the PET and the polyolefin or barrier layer.

Typically, the structures, such as PET/tie/PE/Tie/PA/tie/PE; PET/tie/ionomer or EAA/tie/PA/EVOH/PA/tie/PE; or PET/tie/PE/Tie/PA/EVOH/tie/PE are often extruded into films ranging from 35 to 150 microns. Some conventional tie-layer solutions include maleic anhydride modified ethylene methylacrylate polymers, and maleic anhydride modified ethylene vinyl acetate polymers. The tie layer requirements have been becoming more demanding, requiring higher adhesion properties. However these current tie-layer materials are often disadvantageous because of negative taste and odor properties and/or insufficient thermal stability at high processing temperatures ($\geq 225°$ C.). Thus, there is a need for new film compositions that contain tie-layers that have improved adhesion to polyesters, good high temperature processibility, and low taste and odor levels.

U.S. Pat. No. 7,635,509 discloses multilayer film webs having a layer of an oxygen-permeable composition that is a blend of the following: i) an organic acid or organic acid salt; ii) a copolymer of a) ethylene, b) an C3 to C8 $\alpha$, $\beta$-ethylenically unsaturated carboxylic acid, and optionally c) an alkyl acrylate or alkyl methacrylate comonomer; and iii) at least one additional ethylene-containing polymer selected from the group consisting of ethylene homopolymers and ethylene copolymers, other than ethylene acid copolymers and ionomers. Greater than 70% of the total acid moieties of (i) plus (ii) are neutralized to the corresponding metal salts.

U.S. Pat. No. 5,139,805 discloses a multi-ply, heat-shrinkable film that has a surface layer for contact with a cooked or processed meat product. The film surface layer is formed of an ethylene-ethyl acrylate-maleic anhydride copolymer, or a mixture of the ethylene-ethyl acrylate-maleic anhydride copolymer and a polyolefin. The content of ethyl acrylate component in the surface layer is 2 to 20%, by weight, and the content of maleic anhydride component is 1 to 5%, by weight.

International Publication WO 2012/037180 discloses a multilayer film structure, and more particularly a formable, high vapor barrier, multilayer film structure. The film structure comprises at least the following four layers: a) a core layer comprising a polyvinylidene chloride resin, b) a first tie layer, c) a second tie layer, and d) a first copolyester outer layer that has an intrinsic viscosity of 0.4 dl/g to 0.7 dl/g. Optionally, the multilayer film structure comprises a second outer layer comprising one or more copolyester resins. The multilayer film structure may optionally have one or more inner layer and/or one or more additional tie layer between each of the outer/inner layers and the first and second tie layers.

EP Patent 1049751B1 discloses a polyethylene-based adhesive composition which contain as little as five weight percent, and up to 35 weight percent of an acid-grafted metallocene polyethylene. The adhesive composition is disclosed as having superior peel strength to comparable compositions containing an acid grafted, non-metallocene and EVA or EMA polyethylene. Compositions, where the acid-grafted metallocene polyethylene component is based on a metallocene polyethylene, having a melt-flow ratio of less than 6.53, and an Mw/Mn of greater than the melt flow ratio less 4.63, are disclosed as good adhesive compositions.

JP2006117709A (Abstract) disclosed a polyester film suitable for the packaging use, and which is disclosed as having little "over-time change" of a physical property, and as having a low-temperature heat-sealing property. The film is formed by the inflation molding of a resin composition, comprising from 1 to 20 weight percent of an ethylene-based-copolymer (C), which is modified|denatured [carboxylic-acid-] or modified|denatured [epoxy], and 5 to 50 weight % of ethylene-polymer (B) of density 0.850-0.910 (g/cm3).

Additional compositions are disclosed in the following references: U.S. Pat. No. 4,639,398; U.S. Publication Nos. 2007275219 and 20120064269; International Publication WO 2008080111; De Gooijer, J. M., et al., *Polym. Eng. Sci.* 41, 86-94, 2001; Becker, P., et al., 1389-94, ANTEC 1991 (Abstract); Durgun, H, et al., *Adhesion Sci. Technol.*, 19, 407-425, 2005 (Abstract); Becker et al., *Annual Technical Conference-Society of Plastic Engineers*, 1991, 49th, 1389-94 (Abstract).

However, as discussed above, there remains a need for new multilayer film configurations that contain tie-layers compositions that have improved adhesion to polyesters. These needs and others have been met by the following invention.

SUMMARY OF THE INVENTION

The invention provides a film comprising at least two layers, a first layer and a second layer;

and wherein the first layer is formed from a first composition comprising a polyester and/or a polylactic acid; and wherein the second layer is formed from a second composition comprising at least the following:

A) a functionalized ethylene-based polymer, and

B) at least one ethylene/alkylacrylate copolymer.

DETAILED DESCRIPTION OF THE INVENTION

Figure 1:
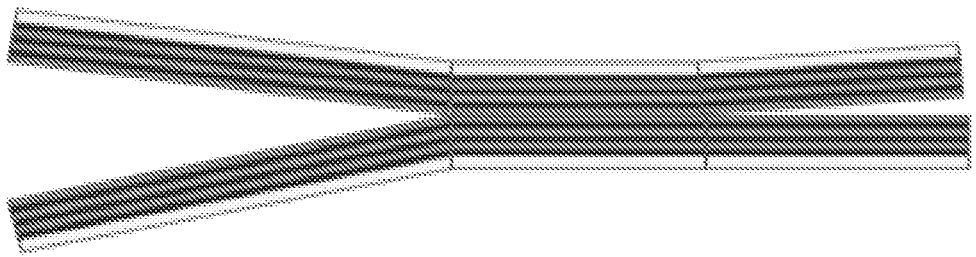
FIG. 1 is a schematic depicting a "sealed film" used in the adhesion test.

As discussed above, the invention provides a film comprising at least two layers, a first layer and a second layer; and wherein the first layer is formed from a first composition comprising a polyester and/or a polylactic acid; and wherein the second layer is formed from a second composition comprising at least the following components:
A) a functionalized ethylene-based polymer, and
B) at least one ethylene/alkylacrylate copolymer.

An inventive film may comprise a combination of two or more embodiments described herein.

In one embodiment, the first layer is in contact with the second layer.

In one embodiment, the first layer is an exterior film layer.

In one embodiment, the second composition comprises two ethylene/alkylacrylate copolymers (component B). In a further embodiment, one ethylene/alkylacrylate copolymer (first ethylene/alkylacrylate copolymer) has a melt index (I2) that is at least 2× the I2 value of the other ethylene/alkylacrylate copolymer (second ethylene/alkylacrylate copolymer). In a further embodiment, the amount of the "ethylene/alkylacrylate copolymer (second ethylene/alkylacrylate copolymer) that has the lower I2" is less than, or equal to, the amount of the "ethylene/alkylacrylate copolymer (first ethylene/alkylacrylate copolymer) that has the higher I2." In a further embodiment, the weight ratio of the "second ethylene/alkylacrylate copolymer" to the first "ethylene/alkylacrylate copolymer" is from 0.5 to 1, further from 0.6 to 1, and further from 0.7 to 1.

In one embodiment, the second composition comprises less, or equal to, 60 weight percent of the functionalized ethylene-based polymer of component A, based on the sum weight of component A and component B.

In one embodiment, the second composition comprises less, or equal to, 50 weight percent of the functionalized ethylene-based polymer of component A, based on the sum weight of component A and component B.

In one embodiment, the second composition comprises less, or equal to, 45 weight percent of the functionalized ethylene-based polymer of component A, based on the sum weight of component A and component B.

In one embodiment, the second composition comprises less, or equal to, 40 weight percent of the functionalized ethylene-based polymer of component A, based on the sum weight of component A, component B.

In one embodiment, the second composition comprises greater, or equal to, 10 weight percent, further greater, or equal to, 15 weight percent, further greater, or equal to, 20 weight percent, of the functionalized ethylene-based polymer of component A, based on the sum weight of component A and component B.

In one embodiment, the second composition comprises from 10 to 50 weight percent, and further from 20 to 50 weight percent, and further from 30 to 50 weight percent, of the functionalized ethylene-based polymer of component A, based on the sum weight of component A and component B.

In one embodiment, the second composition comprises from 50 to 90 weight percent, and further from 50 to 80 weight percent, and further from 40 to 70 weight percent, at least one ethylene/alkylacrylate copolymers of component B, based on the sum weight of component A and component B.

In one embodiment, the weight ratio of component B to component A (B:A) is from 90:10 to 40:60, further from 80:20 to 50:50 and further from 70:30 to 50:50.

In one embodiment, the weight ratio of component B to component A is from 9 to 1.

In one embodiment, the weight ratio of component B to component A is from 4 to 1.

In one embodiment, the second composition comprises less, or equal to, 60 weight percent of the functionalized ethylene-based polymer of component A, based on the weight of the second composition.

In one embodiment, the second composition comprises less, or equal to, 50 weight percent of the functionalized ethylene-based polymer of component A, based on the weight of the second composition.

In one embodiment, the second composition comprises less, or equal to, 45 weight percent of the functionalized ethylene-based polymer of component A, based on the weight of the second composition.

In one embodiment, the second composition comprises less, or equal to, 40 weight percent of the functionalized ethylene-based polymer of component A, based on the weight of the second composition.

In one embodiment, the second composition comprises greater, or equal to, 10 weight percent of the functionalized ethylene-based polymer of component A, based on the weight of the second composition.

In one embodiment, the second composition comprises greater, or equal to, 20 weight percent of the functionalized ethylene-based polymer of component A, based on the weight of the second composition.

In one embodiment, the second composition comprises greater than, or equal to, 40 weight percent, further greater than, or equal to, 50 weight percent, further greater than, or equal to, 60 weight percent of the at least one ethylene/alkylacrylate copolymer of component B, based on the sum weight of component A and component B.

In one embodiment, the second composition comprises from 10 to 50 weight percent, and further from 20 to 50 weight percent, and further from 30 to 50 weight percent, of the functionalized ethylene-based polymer of component A, based on the weight of the second composition.

In one embodiment, the second composition comprises from 10 to 90 weight percent, and further from 20 to 80 weight percent, and further from 30 to 70 weight percent, of at least one ethylene/alkylacrylate copolymer of component B, based on the weight of the second composition.

In one embodiment, the second composition comprises greater than, or equal to, 90 weight percent of the "sum weight of components A and B," based on the weight of the second composition.

In one embodiment, the second composition comprises greater than, or equal to, 95 weight percent of the "sum weight of components A and B," based on the weight of the second composition.

In one embodiment, the second composition comprises greater than, or equal to, 98 weight percent of the "sum weight of components A and B," based on the weight of the second composition.

In one embodiment, the second composition has a melt index (I2) from 0.5 to 50, further from 1 to 30, and further from 1.5 to 20 g/10 min.

In one embodiment, the second composition has a melt index (I2) from 0.5 to 20, further from 1 to 15, further from 1.5 to 12 g/10 min, and further from 1.5 to 5 g/10 min.

In one embodiment, the second composition has a density from 0.880 to 0.940 g/cc, further from 0.885 to 0.935 g/cc, further from 0.890 to 0.930 g/cc (1 cc=1 cm$^3$).

In one embodiment, the second composition has a density from 0.890 to 0.925 g/cc, further from 0.900 to 0.920 g/cc, further from 0.900 to 0.920 g/cc (1 cc=1 cm$^3$).

In one embodiment, the second composition has a density less than, or equal to, 0.925 g/cc, further less than, or equal to, 0.920 g/cc, further less than, or equal to, 0.918 g/cc.

In one embodiment, the second composition has a density less than, or equal to, 0.915 g/cc, further less than, or equal to, 0.910 g/cc.

In one embodiment, the second composition has a density greater than, or equal to, 0.865 g/cc, further greater than, or equal to, 0.870 g/cc, further greater than, or equal to, 0.875 g/cc.

In one embodiment, the second composition has a density greater than, or equal to, 0.880 g/cc, further greater than, or equal to, 0.885 g/cc, further greater than, or equal to, 0.890 g/cc.

In one embodiment, the second composition comprises less than 0.5 weight percent, preferably less than 0.1 weight percent, more preferably less than 0.05 weight percent of an ethylene vinyl acetate polymer (EVA).

In one embodiment, the second composition does not comprise an ethylene vinyl acetate polymer (EVA).

The second composition may comprise a combination of two or more embodiments as described herein.

In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene-based homopolymer. In another embodiment, the functionalized ethylene-based polymer is a functionalized ethylene/alpha-olefin interpolymer, and further a functionalized ethylene/alpha-olefin copolymer.

In one embodiment, the functionalized ethylene-based polymer of component A comprises COOH groups and/or anhydride groups.

In one embodiment, the functionalized ethylene-based polymer of component A has a density from 0.860 to 0.940 g/cc, further from 0.865 to 0.930 g/cc, further from 0.870 to 0.920 g/cc.

In one embodiment, the functionalized ethylene-based polymer of component A has a melt index (I2: 2.16 kg/190° C.) from 0.5 g/10 min to 10 g/10 min, further from 0.7 g/10 min to 5 g/10 min, and further from 1 g/10 min to 3 g/10 min.

In one embodiment, the functionalized ethylene-based polymer of component A comprises units derived from ethylene and maleic anhydride (MAH) and/or maleic acid.

In one embodiment, the functionalized ethylene-based polymer is a MAH-grafted ethylene-based polymer. In a further embodiment, the MAH-grafted ethylene-based polymer has a melt index (I2) from 0.5 to 10 g/10 min, further from 1 to 6 g/10 min. A "MAH-grafted ethylene-based polymer" comprises grafted groups derived from maleic anhydride.

In one embodiment, the functionalized ethylene-based polymer is a MAH-grafted ethylene-based polymer. In a further embodiment, the MAH-grafted ethylene-based polymer has an MAH-graft level from 0.05 to 1.20 weight percent, based on the weight of the second composition. In a further embodiment, the MAH-grafted ethylene-based polymer has an MAH-graft level is from 0.07 to 1.00 weight percent, based on the weight of the second composition. In a further embodiment, the MAH-grafted ethylene-based polymer has an MAH-graft level is from 0.10 to 0.60 weight percent, based on the weight of the second composition.

In one embodiment, the functionalized ethylene-based polymer is a MAH-grafted ethylene-based polymer. In a further embodiment, the MAH-grafted ethylene-based polymer has an MAH-graft level from 0.05 to 1.20 weight percent, based on the sum weight of components A and B. In a further embodiment, the MAH-grafted ethylene-based polymer has an MAH-graft level from 0.07 to 1.00 weight percent, based on the sum weight of components A and B. In a further embodiment, the MAH-grafted ethylene-based polymer has an MAH-graft level from 0.10 to 0.60 weight percent, based on the sum weight of components A and B.

In one embodiment, the alkylacrylate of the at least one ethylene/alkylacrylate copolymer of component B is a C2-C10 alkylacrylate, further a C2-C5 alkylacrylate, further a C2-C3 alkylacrylate, and further ethylacrylate.

In one embodiment, the at least one ethylene/alkylacrylate copolymer of component B (second composition) has a density less than, or equal to, 0.940 g/cc. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the ethylene/alkylacrylate copolymer of component B (second composition) has a density less than, or equal to, 0.935 g/cc. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the ethylene/alkylacrylate copolymer of component B (second composition) has a density greater than, or equal to, 0.900 g/cc. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the ethylene/alkylacrylate copolymer of component B (second composition) has a density greater than, or equal to, 0.905 g/cc. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the at least one ethylene/alkylacrylate copolymer of component B has a density from 0.910 to 0.940 g/cc. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the at least one ethylene/alkylacrylate copolymer of component B (second composition) has a melting point (Tm) less than 130° C., further less than 115° C., further less than 100° C., as determined by DSC. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the at least one ethylene/alkylacrylate copolymer of component B (second composition) has a melting point (Tm) greater than 75° C., further greater than 85° C., further greater than 93° C., as determined by DSC. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the at least one ethylene/alkylacrylate copolymer of component B has a melt index (I2) greater than, or equal to, 0.1 g/10 min, or greater than, or equal to, 0.5 g/10 min, or greater than, or equal to, 1.0 g/10 min. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the ethylene/alkylacrylate copolymer of component B has a melt index (I2) less than, or equal to, 50 g/10 min, further less than, or equal to, 20 g/10 min, further less than, or equal to, 10 g/10 min. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the ethylene/alkylacrylate copolymer of component B has a melt index (I2) from 0.1 to 50 g/10 min, further from 0.5 to 30 g/10 min, further from 0.5 to 25 g/10, further from 0.5 to 10 g/10 min. In a further embodiment, the alkylacrylate of the at least one ethylene/alkylacrylate copolymer of component B is a C1-C10 alkylacrylate, further a C2-C5 alkylacrylate, further a C2-C3 alkylacrylate, and further ethylacrylate.

In one embodiment, the second composition further comprises C) an ethylene/alpha-olefin interpolymer. In a further embodiment, the ethylene/alpha-olefin interpolymer is an ethylene/alpha-olefin copolymer.

In one embodiment, the an ethylene/alpha-olefin interpolymer of component C has a density less than, or equal to, 0.90 g/cc, further less than, or equal to, 0.89 g/cc, and further less than, or equal to, 0.88 g/cc. In a further embodiment, the ethylene/alpha-olefin interpolymer is an ethylene/alpha-olefin copolymer.

In one embodiment, the an ethylene/alpha-olefin interpolymer of component C has a density greater than, or equal to, 0.85 g/cc, further greater than, or equal to, 0.86 g/cc, and further greater than, or equal to, 0.87 g/cc. In a further embodiment, the ethylene/alpha-olefin interpolymer is an ethylene/alpha-olefin copolymer.

In one embodiment, the alpha-olefin of the ethylene/alpha-olefin interpolymer of component C is a C3-C10 alpha-olefin, and further selected from propylene, 1-butene, 1-hexene and 1-octene. In a further embodiment, the ethylene/alpha-olefin interpolymer is an ethylene/alpha-olefin copolymer.

In one embodiment, the ethylene/alpha-olefin interpolymer of component C, and further an ethylene/alpha-olefin copolymer, is present in an amount from 5 to 20 weight percent, based on the weight of the second composition. In a further embodiment, the second composition comprises from 20 to 50 weight percent, further from 30 to 50 weight percent of the functionalized ethylene-based polymer, and further a MAH-grafted ethylene-based polymer, based on the weight of the second composition.

The ethylene/alpha-olefin interpolymer, and further an ethylene/alpha-olefin copolymer, of component C may comprise a combination of two or more embodiments as described herein.

In one embodiment, the second composition further comprises a linear low density polyethylene (LDPE) and/or an ethylene/α-olefin multiblock interpolymer (see, for example, WO 2005/090427, US2006/0199931, and US2006/0199930; each incorporated herein by reference).

In one embodiment, the second composition further comprises a LDPE. In a further embodiment, the LDPE is present in an amount from 5 to 70 weight percent, further from 10 to 50 weight percent, and further from 15 to 20 weight percent, based on the weight of the second composition. In a further embodiment, the second composition comprises 20 to 50 weight percent, further from 20 to 40 weight percent of the functionalized ethylene-based polymer, and further a MAH-grafted ethylene-based polymer.

In one embodiment, the second composition further comprises an ethylene/α-olefin multiblock interpolymer. In a further embodiment, the ethylene/α-olefin multiblock interpolymer is present in an amount from 5 to 70 weight percent, further from 10 to 50 weight percent, and further from 15 to 20 weight percent, based on the weight of the second composition. In a further embodiment, the second composition comprises 20 to 50 weight percent, further from 20 to 40 weight percent of the functionalized ethylene-based polymer, and further a MAH-grafted ethylene-based polymer.

In one embodiment, the second composition further comprises one or more additives. In a further embodiment, the one or more additives are selected from antioxidants, fillers, or combinations thereof.

The second composition may comprise a combination of two or more embodiments as described herein.

The functionalized ethylene-based polymer of component B may comprise a combination of two or more embodiments as described herein.

The at least one ethylene/alkylacrylate copolymer of component B may comprise a combination of two or more embodiments as described herein.

In one embodiment, the first composition comprises greater than, or equal to, 40 weight percent, further greater than, or equal to, 50 weight percent, further greater than, or equal to, 60 weight percent, of the polyester, the PLA, or the combination thereof, based on the weight of the first composition.

In one embodiment, the first composition comprises greater than, or equal to, 70 weight percent, further greater than, or equal to, 80 weight percent, further greater than, or equal to, 90 weight percent, of the polyester, the PLA, or the combination thereof, based on the weight of the first composition.

In one embodiment, the first composition comprises greater than, or equal to, 95 weight percent, further greater than, or equal to, 98 weight percent, of the polyester, the PLA, or the combination thereof, based on the weight of the first composition.

In one embodiment, the first composition comprises a polyester. Polyesters include, but are not limited to, polyethylene terephthalate, polybutylene terephthalate, and a "benzenedicarboxylic acid polymer with a cyclohexanedimethanol and an ethanediol."

In one embodiment, the first composition comprises greater than, or equal to, 40 weight percent, further greater than, or equal to, 50 weight percent, further greater than, or equal to, 60 weight percent, of the polyester, based on the weight of the first composition.

In one embodiment, the first composition comprises greater than, or equal to, 70 weight percent, further greater than, or equal to, 80 weight percent, further greater than, or equal to, 90 weight percent, of the polyester, based on the weight of the first composition.

In one embodiment, the first composition comprises greater than, or equal to, 95 weight percent of the polyester, further greater than, or equal to, 98 weight percent, based on the weight of the first composition.

In one embodiment, the polyester has a melting temperature greater than 200° C., further greater than 210° C., and further greater than 220° C., as determined by DSC.

In one embodiment, the polyester has a melting temperature less than 250° C., further less than 240° C., and further less than 235° C., as determined by DSC.

In one embodiment, the polyester has a density from 1.20 to 1.40 g/cc.

The polyester may comprise a combination of two or more embodiments as described herein.

The PLA may comprise a combination of two or more embodiments as described herein.

In one embodiment, the first composition further comprises one or more additives. In a further embodiment, the one or more additives are selected from antioxidants, fillers, or combinations thereof.

The first composition may comprise a combination of two or more embodiments as described herein.

The second composition may comprise a combination of two or more embodiments as described herein.

The first layer may comprise a combination of two or more embodiments as described herein.

The second composition may comprise a combination of two or more embodiments as described herein.

In one embodiment, for the inventive film, the thickness ratio of the first layer to the second layer is from 0.70 to 0.99.

In one embodiment, the film further comprises a third layer formed from a composition comprising an EVOH, a polyamide, or a combination thereof.

In one embodiment, the inventive film comprises less than 0.5 weight percent, preferably less than 0.1 weight percent, more preferably less than 0.05 weight percent of a LDPE (high pressure, free-radical polymerized).

In one embodiment, the inventive film does not comprise a LDPE (high pressure, free-radical polymerized).

In one embodiment, the inventive film comprises less than 0.5 weight percent, preferably less than 0.1 weight percent, more preferably less than 0.05 weight percent of a polyethylene homopolymer or an ethylene/C3-C20 copolymer with a density greater than 0.93 g/cc.

In one embodiment, the inventive film does not comprise a polyethylene homopolymer, or an ethylene/C3-C20 copolymer with a density greater than 0.93 g/cc.

In one embodiment, the inventive film comprises less than 0.5 weight percent, preferably less than 0.1 weight percent, more preferably less than 0.05 weight percent of a tackifier.

In one embodiment, the inventive film does not comprise a tackifier.

In one embodiment, the first layer and the second layer comprise, together, from 10 to 50 percent, further from 15 to 50 percent, and further from 20 to 50 weight percent of the total film thickness.

An inventive film may comprise a combination of two or more embodiments as described herein.

The term "film," as used herein, refers to both films and sheets, and typically an inventive will have a thickness greater, or equal to, than 50 microns. A film will typically contain multiple layers.

The invention also provides an article comprising an inventive film as described herein.

An inventive article may comprise a combination of two or more embodiments as described herein.

Ethylene/alkylacrylate Copolymer(s) (Component B—Second Composition)

Ethylene/alkylacrylate copolymers include, but are not limited to, polymers formed by polymerizing ethylene with one or more, and preferably one, C3-C10 alkylacrylate. Illustrative alkyls include, but are not limited to, methyl, ethyl, propyl, butyl, hexyl, heptyl, and octyl. Preferably, the α-olefin is methyl, ethyl, propyl and butyl, further methyl, ethyl, propyl, further methyl, ethyl, and further ethyl. Preferred copolymers include ethylene/methylacrylate copolymers, ethylene/ethylacrylate copolymers, ethylene/-propylacrylate copolymers and ethylene/butylacrylate copolymers. In a further embodiment, the ethylene/alkylacrylate copolymer is an ethylene/ethylacrylate copolymer.

In one embodiment, the at least one ethylene/alkylacrylate copolymer comprises from 5 to 20 weight percent, further from 10 to 20 weight percent, of the alkylacrylate, based on the weight of the ethylene/alkylacrylate copolymer.

Commercial examples of suitable ethylene/alkylacrylate copolymers include, but are not limited to, AMPLIFY EA Functional Polymers, available from The Dow Chemical. Suitable ethylene/alkylacrylates include AMPLIFY EA 100, AMPLIFY EA 101 and AMPLIFY EA 103 Functional Polymers.

In one embodiment, the at least one ethylene/alkylacrylate copolymer has a melting point (Tm) greater than 70° C., or greater than 80° C., or greater than 90° C., as determined by DSC.

In one embodiment, the at least one ethylene/alkylacrylate copolymer has a melting point (Tm) less than 130° C., or less than 120° C., or less than 110° C., as determined by DSC.

In one embodiment, the at least one ethylene/alkylacrylate copolymer has a density greater than, or equal to, 0.890 g/cc, or greater than, or equal to, 0.900 g/cc, or greater than, or equal to, 0.910 g/cc.

In one embodiment, the at least one ethylene/alkylacrylate copolymer has a density less than, or equal to, 0.945 g/cc, or less than, or equal to, 0.940 g/cc, or less than, or equal to, 0.935 g/cc.

In one embodiment, the at least one ethylene/alkylacrylate copolymer has a melt index (I2) greater than 0.1 g/10 min, or greater than, or equal to, 0.5 g/10 min, or greater than, or equal to, 1.0 g/10 min.

In one embodiment, the at least one ethylene/alkylacrylate copolymer has a melt index (I2) less than, or equal to, 100 g/10 min, or less than, or equal to, 50 g/10 min, or less than, or equal to, 20 g/10 min, or less than, or equal to, 10 g/10 min.

An ethylene/alkylacrylate copolymer may comprise a combination of two or more embodiments as described herein.

Functionalized Ethylene-Based Polymer (Component A—Second Composition)

The term "functionalized ethylene-based polymer," as used herein, refers to an ethylene-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

Some examples of compounds that can be grafted onto the ethylene-based polymer include ethylenically unsaturated carboxylic acids and acid derivatives, such as esters, anhydrides, and acid salts. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and mixtures thereof. Maleic anhydride is a preferred compound.

In one embodiment, the functionalized ethylene-based polymer comprises at least one functional group selected from the following:

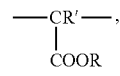

anhydride, and combinations thereof; and wherein R is hydrogen or alkyl, R' is hydrogen or alkyl. In a further embodiment, each alkyl group is, independently, methyl, ethyl, propyl or butyl. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer comprises at least one anhydride group; and further at least one maleic anhydride group. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer is a maleic anhydride-grafted polymer. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the amount of functional group(s) derived from the functionalized ethylene-based polymer is from 0.05 to 1.20 weight percent, based on the weight of the second composition. In a further embodiment, the functionalized ethylene-based polymer has a functional group level from 0.07 to 1.00 weight percent, based on the weight of the second composition. In a further embodiment, the functionalized ethylene-based polymer has a functional group level from 0.10 to 0.60 weight percent, based on the weight of the second composition.

In one embodiment, the amount of functional group(s) derived from the functionalized ethylene-based polymer is from 0.05 to 1.20 weight percent, based on the sum weight of components A and B. In a further embodiment, the functionalized ethylene-based polymer has a functional group level from 0.07 to 1.00 weight percent, based on the sum weight of components A and B. In a further embodiment, the functionalized ethylene-based polymer has a functional group level from 0.10 to 0.60 weight percent, based on the sum weight of components A and B.

In one embodiment, the functionalized ethylene-based polymer comprises MAH-grafted functionality. In a further embodiment, the MAH-graft level is from 0.05 to 1.20 weight percent, based on the weight of the second composition. In a further embodiment, the MAH-graft level is from 0.07 to 1.00 weight percent, based on the weight of the second composition. In a further embodiment, the MAH-graft level is from 0.10 to 0.60 weight percent, based on the weight of the second composition.

In one embodiment, the functionalized ethylene-based polymer comprises MAH-grafted functionality. In a further embodiment, the MAH-graft level is from 0.05 to 1.20 weight percent, based on the sum weight of components A and B. In a further embodiment, the MAH-graft level is from 0.07 to 1.00 weight percent, based on the sum weight of components A and B. In a further embodiment, the MAH-graft level is from 0.10 to 0.60 weight percent, based on the sum weight of components A and B.

In one embodiment, the functionalized ethylene-based polymer comprises MAH-grafted functionality. In a further embodiment, the MAH-graft level is from 0.05 to 1.20 weight percent, based on the weight of the functionalized ethylene-based polymer. In a further embodiment, the MAH-graft level is from 0.07 to 1.00 weight percent, based on the weight of the functionalized ethylene-based polymer. In a further embodiment, the MAH-graft level is from 0.10 to 0.90 weight percent, based on the weight of the functionalized ethylene-based polymer.

In one embodiment, the functionalized ethylene-based polymer comprises MAH-grafted functionality. In a further embodiment, the MAH-graft level is from 0.10 to 2.00 weight percent, based on the weight of the functionalized ethylene-based polymer. In a further embodiment, the MAH-graft level is from 0.50 to 1.50 weight percent, based on the weight of the functionalized ethylene-based polymer. In a further embodiment, the MAH-graft level is from 0.80 to 1.20 weight percent, based on the weight of the functionalized ethylene-based polymer.

In one embodiment, the functionalized ethylene-based polymer has a density from 0.860 to 0.960 g/cc, further from 0.865 to 0.940 g/cc, further from 0.870 to 0.920 g/cc, and further from 0.870 to 0.900 g/cc. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer has a density less than 0.890 g/cc, further less than 0.885 g/cc, and further less than 0.880 g/cc. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer has a density greater than, or equal to, 0.850 g/cc, further greater than, or equal to, 0.855 g/cc, and further greater than, or equal to, 0.860 g/cc. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer has a melt index (I2: 2.16 kg/190° C.) from 0.1 g/10 min to 50 g/10 min, further from 0.5 g/10 min to 20 g/10 min, further from 1.0 g/10 min to 10 g/10 min, and further from 1.0 g/10 min to 5.0 g/10 min. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer has a melt index (I2: 2.16 kg/190° C.) from 0.1 g/10 min to 20 g/10 min, further from 0.5 g/10 min to 10 g/10 min, and further from 1.0 g/10 min to 10 g/10 min. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene. In a further embodiment, the base polymer (ethylene/alpha-olefin interpolymer and further ethylene/alpha-olefin copolymer) used to form the ethylene/alpha-olefin interpolymer, and further a functionalized ethylene/alpha-olefin copolymer, has a density from 0.860 to 0.910 g/cc, further from 0.860 to 0.900 g/cc, and further from 0.860 to 0.890 g/cc. In a further embodiment, the based polymer has a melt index (I2) from 1 to 20 g/10 min, further from 2 to 10 g/10 min, and further from 3 to 6 g/10 min. In a further embodiment, the base polymer has a melt index ratio, I21/I2 from 1 to 10, further from 1 to 5, and further from 1 to 3.

In one embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene. In a further embodiment, the base polymer (ethylene/alpha-olefin interpolymer and further ethylene/alpha-olefin copolymer) used to form the ethylene/alpha-olefin interpolymer, and further a functionalized ethylene/alpha-olefin copolymer, has a density less than 0.890 g/cc, further less than 0.885 g/cc, and further less than 0.880 g/cc. In a further embodiment, the based polymer has a melt index (I2) from 1 to 20 g/10 min, further from 2 to 10 g/10 min, and further from 3 to 6 g/10 min. In a further embodiment, the base polymer has a melt index ratio, I21/I2 from 1 to 10, further from 1 to 5, and further from 1 to 3.

In one embodiment, the base polymer has molecular weight distribution (Mw/Mn) greater than, or equal to, 1.1, or greater than, or equal to, 1.2, or greater than, or equal to, 1.5, or greater than, or equal to, 1.7, as determined by GPC.

In a further embodiment, the base polymer is an ethylene/α-olefin interpolymer, and further an ethylene/α-olefin copolymer.

In one embodiment, the base polymer has molecular weight distribution (Mw/Mn) less than, or equal to, 4.0, or less than, or equal to, 3.5, or less than, or equal to, 2.5, or less than, or equal to, 2.1, as determined by GPC. In a further embodiment, the base polymer is an ethylene/α-olefin interpolymer, and further an ethylene/α-olefin copolymer.

In one embodiment, the base polymer is a homogeneously branched linear ethylene/α-olefin interpolymer, and further a copolymer, or a homogeneous branched substantially linear interpolymer, and further a copolymer.

In one embodiment, the base polymer is homogeneous branched substantially linear ethylene/α-olefin interpolymer, and further a copolymer.

In one embodiment, the base polymer is a homogeneous branched linear ethylene/α-olefin interpolymer, and further a copolymer.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, for example, using bis-metallocene catalysts, have been developed, as shown, for example, in EP 0 129 368; EP 0 260 999; U.S. Pat. No. 4,701,432; U.S. Pat. No. 4,937,301; U.S. Pat. Nos. 4,935,397; 5,055,438; and WO 90/07526; each incorporated herein by reference. As discussed, the homogeneously branched linear ethylene interpolymers lack (no measurable) long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone. See, for example, U.S. Pat. Nos. 5,272,236; 5,278,272; each incorporated herein by reference.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

Suitable commercial functionalized olefin-based polymers include AMPLIFY GR and TY Functional Polymers (for example, AMPLIFY TY 1052H) available from The Dow Chemical Company.

A functionalized ethylene-based polymer may comprise a combination of two or more embodiments as described herein.

A functionalized ethylene homopolymer may comprise a combination of two or more embodiments as described herein.

A functionalized ethylene/alpha-olefin interpolymer may comprise a combination of two or more embodiments as described herein.

A functionalized ethylene/alpha-olefin copolymer may comprise a combination of two or more embodiments as described herein.

Additives

In one embodiment, a polymer composition (for example, first composition and/or second composition) comprises at least one additive. Suitable additives include, but are not limited to, antioxidants, UV stabilizers, foaming agents, flame retardants, colorants or pigments, and combinations thereof.

In one embodiment, a composition comprises at least one filler. In a further embodiment, the filler is selected from carbon black, talc, calcium carbonate, clay or combinations thereof. In one embodiment, the filler is present in an amount less than, or equal to, 70 weight percent, or less than, or equal to, 50 weight percent, or less than, or equal to, 30 weight percent, based on the weight of the composition. In one embodiment, the filler is present in an amount greater than, or equal to, 2 weight percent, or greater than, or equal to, 5 weight percent, or greater than, or equal to, 10 weight percent based on the weight of the composition.

Applications

The invention also provides for an article comprising at least one component formed from an inventive film. Articles include, but are not limited to coextruded films and sheets, packaging films, thermoformed trays, shrink bags and lidding films, and lamination films.

Compositions may be formed into a finished article of manufacture by any one of a number of conventional processes and apparatus. Illustrative processes include, but are not limited to, extrusion, coextrusion, calendaring, injection molding, compression molding, lamination, microlayer coextrusion, blow molding, and other typical processes known in the art.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, may be incorporated into the polymer structure and/or within the bulk polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and an α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Determination of the Maleic Anhydride (MAH) Content—Functionalized Ethylene-Based Polymer and Second Composition Calibration: The maleic anhydride content is measured as follows. The dried resin sample (1-2 grams; functionalized polymer, or composition containing the MAH functionalized ethylene-based polymer and the ethylene/alkylacrylate copolymer (composition typically stabilized with ppm amounts of one more stabilizers)) is dissolved in 150 ml xylene, by heating the sample to 100° C., while stirring, on a stirred hot plate. Upon dissolution, the sample is titrated, while hot, with "0.025N tetrabutylammonium hydroxide (TBAOH) in 1:1 toluene/methanol" using 10 drops of bromothymol blue as an indicator. The endpoint is recorded when the solution turns blue.

FTIR: FTIR spectra are used for determining the level of g-MAH in each sample, using the method calibrated against the TBAOH titration analysis described above. The weight percent of g-MAH is determined from the ratio of the height of the peak at about 1790 cm$^{-1}$, corresponding to the carbonyl stretch of the anhydride, to the height of the 2751 cm$^{-1}$, as follows.

$$\text{wt \% MAH} = 0.0313 \times \frac{(\text{peak height @ } ca.1790 \text{ cm}^{-1})}{(\text{peak height @ } ca.2751 \text{ cm}^{-1})} +$$
$$0.2145 \times \frac{(\text{peak height @ } ca.1790 \text{ cm}^{-1})}{(\text{peak height @ } ca.2751 \text{ cm}^{-1})} + 0.0645$$

Melt Index

Melt index (I2) was measured in accordance with ASTM D-1238 (190° C.; 2.16 kg). The result was reported in grams/10 minutes. Melt flow rate (MFR) was measured in accordance with ASTM D-1238 (230° C.; 2.16 kg). The result was reported in grams/10 minutes.

Density

Density is measured in accordance with ASTM D-792.

Gel Permeation Chromatography (GPC)

Conventional GPC measurements are used to determine the weight-average (Mw) and number-average (Mn) molecular weight of the polymer, and to determine the MWD (=Mw/Mn). "Samples are analyzed with a high-temperature GPC instrument (Polymer Laboratories, Inc. model PL220).

The method employs the well-known universal calibration method, based on the concept of hydrodynamic volume, and the calibration is performed using narrow polystyrene (PS) standards, along with four Mixed A 20 µm columns (PLgel Mixed A from Agilent (formerly Polymer Laboratory Inc.)) operating at a system temperature of 140° C. Samples are prepared at a "2 mg/mL" concentration in 1,2,4-trichlorobenzene solvent. The flow rate is 1.0 mL/min, and the injection size is 100 microliters.

As discussed, the molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, (621) 1968) to derive the following equation:

$$M\text{polyethylene} = a^*(M\text{polystyrene})^b.$$

In this equation, a=0.4316 and b=1.0 (as described in Williams and Ward, *J. Polym. Sc., Polym. Let.*, 6, 621 (1968)). Polyethylene equivalent molecular weight calculations were performed using VISCOTEK TriSEC software Version 3.0.

Differential Scanning Calorimetry (DSC)

Differential Scanning Calorimetry (DSC) is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Experimental

Study A

Polymers used in this study are shown in Tables 1 and 2. Polymers are typically stabilized with one or more stabilizers.

TABLE 1

Polymers

| Polymer | Density [g/cm$^3$] | Melt index (I2) [g/10 min] | Type | Supplier |
|---|---|---|---|---|
| CUMASTRETCH FX NATURAL* | 1.34 | | Polyethylene Terephthalate | Dufor |
| DOWLEX NG 5056G | 0.919 | 1.1 | Linear Low Density Polyethylene | DOW |
| NYLON 5034B (PA) | 1.140 | | Copolyamide 6/66 | UBE |
| EVAL F171B | 1.19 | 1.8 | Ethylene-Vinylalcohol Copolymer (EVOH) | Kuraray |
| ADMER SF 730E | 0.90 | 2.7 | Elastomer based Adhesive | Mitsui |
| BYNEL 21E787 | 0.930 | 1.6 | Anhydride Modified Ethylene Acrylate | DuPont |

*Intrinsic Viscosity = 0.8 dl/g [solution viscosity of 0.5 g/dl polymer solution in mixture of phenol and 1.2-dichlorobenzene (1:1); 25° C.]

TABLE 2

Polymers for Tie Layer Formulations:

| Material | Type | Density [g/cm³] | Melt Index (I2) [g/10 min] | EA (wt %)* | MAH (wt %)* | Tm (° C.) |
|---|---|---|---|---|---|---|
| MAH-g-EO | Maleic anhydride (MAH) grafted ethylene-octene copolymer | 0.870 | 1.25 | — | 0.8 | 62.8 |
| EEA10 | Ethylene-ethylacrylate copolymer | 0.93 | 1.3 | 15 | — | 98.9 |
| EEA11 | Ethylene-ethylacrylate copolymer | 0.93 | 6.0 | 18.5 | — | 97.8 |

*Based on weight of polymer.

Preparation of Tie Layers

Tie layer compositions, using the materials specified in Table 2, were compounded on the BUSS Kneader following the formulations given in Table 3. All components were mixed at 190° C. for two minutes. Tie layers A and B were commercial resins that are known to be used as tie layer resins in films containing PET. Tie layer A is ADMER SF 730E from Mitsui, and tie layer B is BYNEL 21E787 from DuPont.

TABLE 3

Tie Layer Compositions
(Each amount in wt %, based on weight of the composition)

| Resins (wt %) | 1 | 2 | A | B |
|---|---|---|---|---|
| MAH-g-EO | 50 | 30 | | |
| EEA10 | 20 | 35 | | |
| EEA11 | 30 | 35 | | |
| ADMER SF 730E | | | 100 | |
| BYNEL 21E787 | | | | 100 |
| Density (g/cc) | 0.901 | 0.912 | 0.903 | 0.93 |
| Melt index (I2) g/10 min | 2.04 | 1.94 | 2.7 | 1.6 |
| Wt % MAH (based on weight of composition) | 0.4 | 0.24 | | |

Some properties of the compounded tie layers are shown in Table 4.

TABLE 4

Properties of Tie Layer Compositions

| Tie Layer | Density [g/cm³] ASTM D 793 | MI (190° C.; 2.16 kg) [g/10 min] ISO 1133 | VICAT Softening Temp. (° C.) ASTM D1525 | Shore A ASTM D2240 |
|---|---|---|---|---|
| 1 | 0.901 | 2.04 | 57 | 85 |
| 2 | 0.912 | 1.94 | 39 | 74 |
| A | 0.903 | 2.7 | 56 | 83 |
| B | 0.93 | 1.6 | 53 | 84 |

For Vicat and Shore A, the following test conditions shown in Table 5 were used to prepare the specimen. Each sample thickness was 3 mm. Compression-molded sheets were prepared in accordance with ISO 293 (type of frame used) using the conditions specified in accordance with ISO 1872 (Table 2 of ISO 1872).

TABLE 5

(ISO 293, Cooling Method B -PE based)

| | Sample Thickness (mm) | Molding temp. (° C.) | Pre-heating time (minutes) | Pre-heating pressure (MPa) | Full-press time (minutes) | Full-pressure MPa | Demolding temp. ° C. | Average cooling Rate (° C./min) |
|---|---|---|---|---|---|---|---|---|
| Tie layer 1 | 3 | 180° C. | 5-15 | Contact | 5 ± 1 | 5 | ≤40° C. | 15 ± 5° C. per minute |
| Tie layer 2 | 3 | 180° C. | 5-15 | Contact | 5 ± 1 | 5 | ≤40° C. | 15 ± 5° C. per minute |
| A | 3 | 180° C. | 5-15 | Contact | 5 ± 1 | 5 | ≤40° C. | 15 ± 5° C. per minute Should be a fix setting |
| B | 3 | 180° C. | 5-15 | Contact | 5 ± 1 | 5 | ≤40° C. | 15 ± 5° C. per minute |

Preparation of Seven-Layered Films

Seven-layered films were extruded on a "7-Layer Dr. Collin Line," with the layer distributions provided in Tables 6 and 7 below. The extrusion conditions were as follows:

BUR: 2.5,

Layflat width: 235.6 mm,

Total thickness of film 100 micron,

Extruder I: 250-260° C., 23 RPM,

Extruder II: 230° C., 18 RPM,

Extruder III: 230° C., 65 RPM,

Extruder IV: 230° C., 20 RPM,

Extruder V: 250° C., 81 RPM,

Extruder VI: 230° C., 20 RPM, and

Extruder VII: 220° C., 60 RPM.

PET and PA were dried before extruding. After drying the PET and PA (Polyamide) were immediately extruded.

TABLE 6

Film Structure with PA Barrier

| Layers | Thickness (μm) | Resin |
|---|---|---|
| I (outside) | 11 | CUMASTRETCH FX (PET) |
| II | 6 | Tie layer 1, 2, A or B |
| III | 18 | DOWLEX NG 5056G |
| IV | 6 | Tie layer 1, 2, A or B |
| V | 23 | NYLON 5034B (PA) |
| VI | 6 | Tie layer 1, 2, A or B |
| VII (inside) | 30 | DOWLEX NG 5056G |

TABLE 7

Film Structure used with EVOH

| Layers | Thickness (μm) | Resin |
|---|---|---|
| I (outside) | 11 | CUMASTRETCH FX (PET) |
| II | 6 | Tie layer 2 |
| III | 30 | DOWLEX NG 5056G |
| IV | 6 | Tie layer 2 |
| V | 10 | EVAL F 171B |
| VI | 6 | Tie layer 2 |
| VII (inside) | 31 | DOWLEX NG 5056G |

Adhesion Measurement

Films (100 microns), produced according to configurations shown in Tables 5 and 6, were cut into A4 sheets (21 cm×29.7 cm). The longer side (29.7 cm) is along the machine direction. The described A4 sheet was folded along the center line, so that layer VII was in contact with layer VII. The mid section of the folded film sample was seal on a Seal Equipment KOPP SGPE 20, which has following characteristics: both seal bar width 5 mm and seal bar length 200 mm, Teflon coated; upper and lower seal bar heated to 130° C.; seal direction=cross direction. See FIG. 1.

Figure 2:
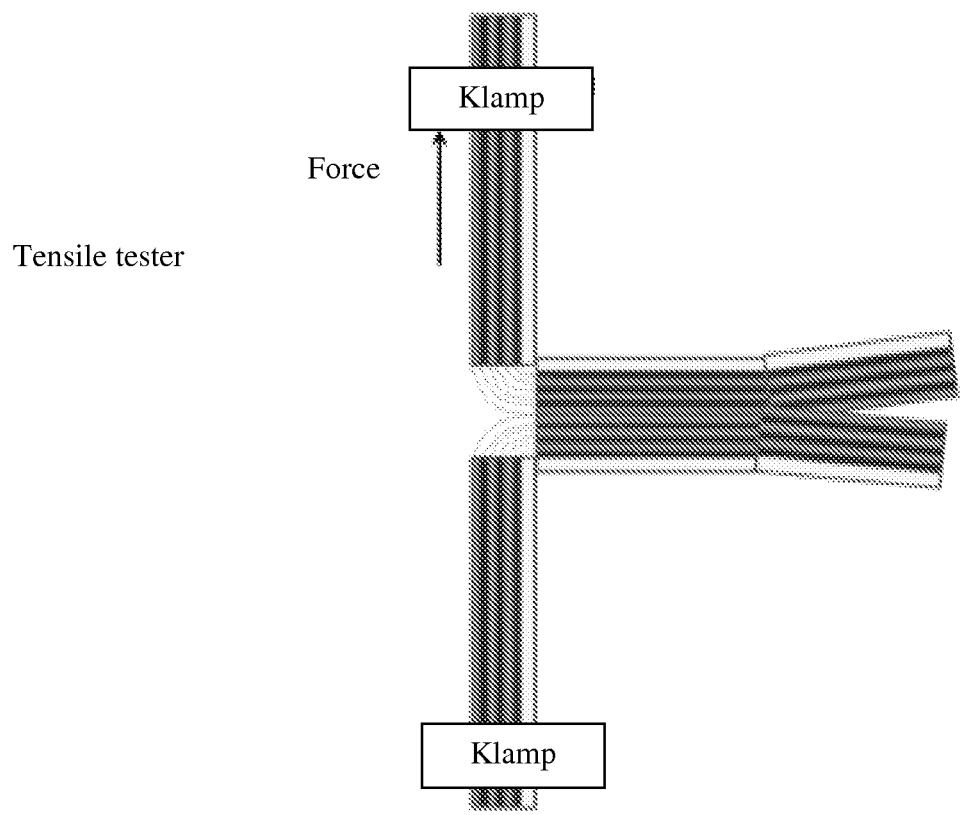
FIG. 2 is a schematic depicting a "pulled film" used in the adhesion test.

The upper and lower seal bars were pressed onto the sample, with a pressure of 0.5 N/mm², for 0.5 seconds. The sealed films were stored for 48 hours, at 23° C., according ISO 293. Than "15 mm wide" strips were cut, long enough to fit into the tensile machine (see FIG. 2), which had a grip distance of 35 mm. The test sample was pulled open in an Lloyd LR 5K seal strength tester, with a speed of 100 mm/min. Sample was pulled in a 180° angle, until the sample fully broke. The "force at peak" was reported in the tables below. This "force at peak" indicated the "minimum seal strength," also interpreted in this case as "minimum adhesion force," to the PET layer, since all the tie layers in the films produced were of the same formulation, and the adhesion of the tie layer to the PET was the weaker interface compared to the polyamide (or EVOH)-tie layer interlayer. Seal strengths are listed in Tables 8 and 9 below.

TABLE 8

Seal Strength in PA Barrier Film

| Tie layer | Force at Peak (min. adhesion force to PET) [N/15 mm] |
|---|---|
| 1 | 39.0 |
| 2 | 40.2 |
| A | 41.1 |
| B | 21.2 |

TABLE 9

Seal Strength in EVOH Barrier Film

| Tie layer | Force at Peak (min. adhesion force to PET) [N/15 mm] |
|---|---|
| 2 | 33.4 |

Figure 3:
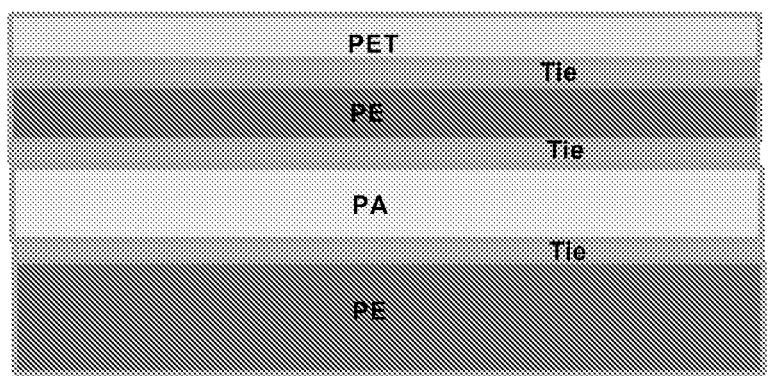
FIG. 3 depicts a multilayer film comprising an external layer, a barrier layer, a sealant layer, and tie layers.

FIG. 3 is a schematic of the multilayer barrier blown film 100 micron: PET/tie/PE/tie/PA/tie/PE (11/6/18/6/23/6/30 micron).

As seen from Tables 8 and 9, it has been unexpectedly discovered that the inventive films containing a tie layer formed from the ethylene/ethylacrylate combined with the maleic anhydride grafted ethylene octene elastomer had unexpectedly high adhesion values, when used as tie layer between PET and PE.

Additional Study B

Polymers used in this study are shown in Tables 10 and 11. Polymers are typically stabilized with one or more stabilizers.

TABLE 10

Polymer

| Polymer | Density [g/cm³] | Melt index (I2) [g/10 min] | Type | Supplier |
|---|---|---|---|---|
| AFFINITY PT 1451G1 | 0.902 | 7.5 | INSITE Technology Catalyst based ethylene octane copolymer | DOW |

TABLE 11

Polymers for Tie Layer Formulations:

| Material | Type | Density [g/cm³] | Melt index (I2) [g/10 min] | EA (wt %)* | MAH (wt %)* | Tm (° C.) |
|---|---|---|---|---|---|---|
| MAH-g-EO | Maleic anhydride (MAH) grafted ethylene-octene copolymer | 0.870 | 1.25 | — | 0.8 | 62.8 |
| EEA12 | Ethylene-ethylacrylate copolymer | 0.93 | 21 | 19.5 | — | 95 |
| LDPE | Low density polyethylene | 0.918 | 2.3 | — | — | 110 |

*Based on weight of polymer.

Preparation of Tie Layers

Tie layer compositions, using the materials specified in Table 11, were compounded on the BUSS Kneader following the recipe given in Table 12. All components were mixed at 190° C. for two minutes. Tie layers A and B were commercial resins. Tie layer A is ADMER SF 730E from Mitsui, and tie layer B is BYNEL 21E787 from DuPont.

TABLE 12

Tie Layer Compositions
(Each amount in wt %, based on weight of the formulation)

| | Tie layer 4 | Tie layer 5 |
|---|---|---|
| MAH-g-EO (wt %) | 20 | 40 |
| EEA12 (wt %) | 64 | 40 |
| LDPE (wt %) | 16 | 20 |
| DSC melting point ° C. | 106 | 106 |
| Density (g/cc) | 0.918 | 0.906 |
| Melt index (I2), g/10 min | 7.5 | 3.7 |
| wt % MAH (based on weight of composition) | 0.16 | 0.32 |

Preparation of Coextrusion Coated OPET Film.

Two layers, the tie layer (Layer B) and the sealant layer (Layer A) were coextrusion coated onto an oriented polyester film (OPET) (FLEXPET F-PAP from Flexfilm; 36 micron thickness). See Table 13. The temperature settings for the Extrusion Coating Settings:
Extruder A: 3.5"×32D Extruder—General Purpose Screw,
Extruder B: 2.5"×28D Extruder—General Purpose Screw,
Temperature profile for both extruders was set to bring the melt to a temperature of 320° C.,
Adapter/Pipes was heated to 320° C.,
The feedblock was heated to 320° C., A feedblock B/A was selected with a split 30% in layer B and 70% layer A, with Layer B facing an OPET substrate, and layer A facing the chill roll, The flat die was heated over the complete width to 320° C. on both sides, The Chill roll temperature was 20° C., and Line speed was 100 m/minute.

TABLE 13

Coated Structure OPET substrate

| Layers | Thickness (µm) | Resin |
|---|---|---|
| A (outside) | 22 | AFFINIY TY 1451G1 |
| B | 8 | Tie layer 4 or 5 |
| substrate | 36 | OPET |

Adhesion Measurement

The coated OPET was then cut into 15 mm wide strips, long enough to fix into the Tensile machine, which had a grip distance of 35 mm. The delamination was initiated by careful peeling the coating ("Layer A and Layer B" coating) from the OPET. The coating was fixed into one of the upper tensile machine clamps, and the OPET in the second tensile machine clamp. The coating was pulled off the OPET using an Lloyd LR 5K tensile tester, with a speed of 125 mm/min with a load cell of 50 N. Adhesion results are shown in Table 14.

TABLE 14

Adhesion Results

| Coating | Adhesion to OPET measured in N/15 mm |
|---|---|
| Tie layer 4 in coextrusion with AFFINITY PT 1451G1 | 4.7 |
| Tie layer 5 in coextrusion with AFFINITY PT 1451G1 | 3.8 |

As seen in Table 14, the inventive films show excellent adhesion to the OPET substrate. Sufficient adhesion would be an adhesion value of around 2 N/15 mm.

The invention claimed is:

1. A film comprising at least two layers, a first layer and a second layer;

and wherein the first layer is formed from a first composition comprising a polyester and/or a poly lactic acid; and wherein the second layer is formed from a second composition comprising at least the following:

A) 20 to 50 wt %, based on the sum weight of component A and component B, of a maleic anhydride (MAH) grafted ethylene/octene copolymer, B) an ethylene/alkylacrylate copolymer, and C) a low density polyethylene (LDPE), and wherein the LDPE is present in an amount from 10 to 50 weight percent, based on the weight of the second composition; and wherein the ethylene/alkylacrylate copolymer of component B (second composition) has a melting point (Tm) greater than, or equal to, 93° C., as determined by DSC; and a density from 0.910 to 0.940 g/cc; and wherein the weight ratio of component B to component A (B:A) is from 4:1 to 1:1; and wherein the second composition has a melt index ($I2$) from 1.5 to 12 g/10 min.

2. The film of claim 1, wherein the first layer is in contact with the second layer.

3. The film of claim 1, wherein the second composition comprises greater than, or equal to, 50 weight percent of the ethylene/alkylacrylate copolymer of component B, based on the sum weight of component A and component B.

4. The film of claim 1, wherein the ethylene/alkylacrylate copolymer of component B has a melt index ($I2$) from 0.1 to 50 g/10 min.

5. The film of claim 1, wherein the maleic anhydride-graft level is from 0.05 to 1.20 weight percent, based on the weight of the second composition.

6. The film of claim 1, wherein the second composition comprises from 80 to 90 weight percent of the sum weight of components A and B, based on the weight of the second composition.

7. The film of claim 1, wherein the polyester or polylactic acid has a melting point (Tm) greater than 200° C.

8. The film of claim 1, wherein the second composition further comprises an ethylene/α-olefin multiblock interpolymer.

9. An article comprising the film of claim 1.

10. The film of claim 1, comprising from 30 to 50 weight percent of the maleic anhydride (MAH) grafted ethylene/octene copolymer of component A, based on the sum weight of component A and component B.

11. The film of claim 1, wherein the first composition comprises greater than, or equal to, 95 weight percent of the polyester, based on the weight of the first composition, and wherein the polyester has a density from 1.20 to 1.40 g/cc.

12. The film of claim 1, wherein the second composition has a density from 0.900 to 0.920 g/cc.

* * * * *

UNITED STATES PATENT AND TRADEMARK OFFICE
CERTIFICATE OF CORRECTION

PATENT NO. : 10,471,688 B2
APPLICATION NO. : 14/424744
DATED : November 12, 2019
INVENTOR(S) : Eva-Maria Kupsch et al.

It is certified that error appears in the above-identified patent and that said Letters Patent is hereby corrected as shown below:

In the Claims

Column 24, Line 14, Claim 1:
"(B:A) is from 4:1 to 1:1; and"

Should read:
--is from 4 to 1; and--.

Column 24, Line 15, Claim 1:
"wherein the second composition has a melt index (12)"

Should read:
--wherein the second composition has a melt index (I2)--.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*